3,666,429
Patented May 30, 1972

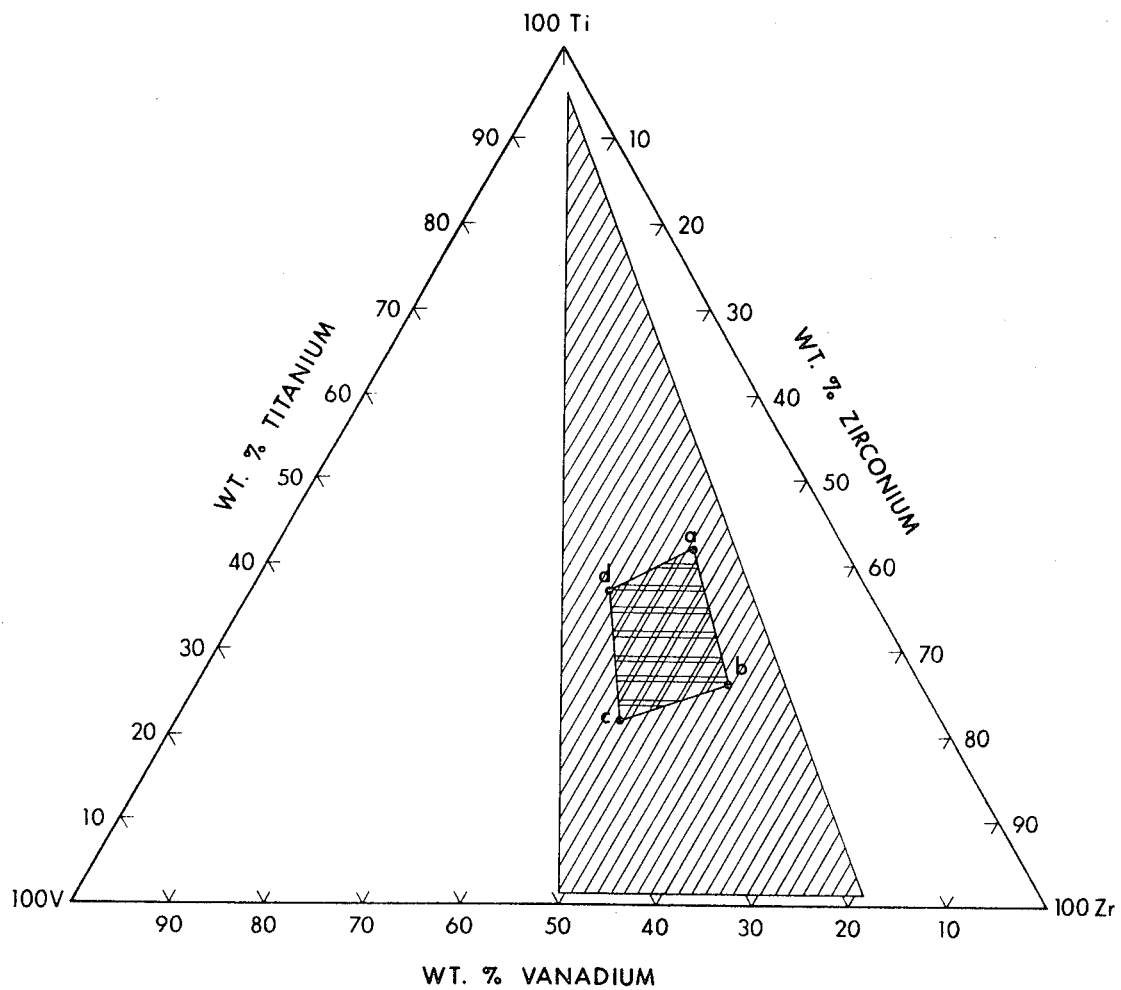

3,666,429
METALLIZED AND BRAZED CERAMICS
Albert Evan Campbell, Jr., and Andrew O. Jensen, Arcadia, Calif., assignors to Xerox Corporation, Rochester, N.Y.
Continuation-in-part of application Ser. No. 646,186, June 15, 1967. This application Sept. 29, 1969, Ser. No. 861,976
Int. Cl. B32b 15/00
U.S. Cl. 29—195
4 Claims

ABSTRACT OF THE DISCLOSURE

A process for metallizing high purity ceramic parts and/or brazing a high purity ceramic part to a refractory metal part or another ceramic part using a ternary titanium, vanadium, and zirconium alloy is described. A particularly efficacious alloy comprising 21–42% titanium, 15–33% vanadium and 36–54% zirconium yields hermetic seals when parts are bonded in accordance with the process described herein.

CROSS REFERENCE TO PARENT APPLICATION

This application is a continuation-in-part application of application Ser. No. 646,186 filed June 15, 1967, now abandoned, both applications being assigned to a common assignee.

BACKGROUND OF THE INVENTION

This application relates to metallurgical alloys and to the use of such alloys in the processing of high purity ceramic parts. The herein-contemplated processing operations include the metallizing of a high purity ceramic part and the brazing of a high purity ceramic part directly to a refractory metal part or another ceramic part without an intermediate metallizing step. A preferred form of the invention relates to alloys of particular composition which, when used in accordance with the processes described herein, yield strong, hermetic seals between the joined parts.

Recent advances made with respect to thermionic converters, lasers and high powdered light sources have brought about unusually severe operating conditions, such as high temperature and extremely corrosive environments normally associated with alkali metal vapors, such as sodium, potassium, lithium, cesium, and rubidium. Because of such operating conditions, many previously utilized construction techniques have been found to be inadequate in producing a structure or device having a sufficiently long working life. A major example of the shortcomings of conventional construction techniques is in the technique of brazing a ceramic part to a refractory metal part. In the past, brazing alloys containing noble metals, such as copper-silver or nickel-gold, have been used in conjunction with metallized ceramics to make such a seal; however, corrosive vapors, for example the aforementioned alkali-metal vapors, attack the brazing alloy and the metallized innerface such that it is totally unsuitable for use in the production of long-life, high temperature devices employing alkali metal vapors. Consequently, the ceramic-metal seal has been formed with active metal brazing alloys, such as nickel-zirconium alloys, copper-titanium alloys, or nickel-titanium alloys which do not contain noble metals. While such brazing alloys are resistant to attack by corrosive vapors, they are normally very brittle and only marginally metallize the ceramic part thus giving a relatively low strength bond between the ceramic part and the metal part bonded thereto. This is particularly so where the metal part is a refractory metal such as tantalum or niobium.

Also, because of the particular difficulty in metallizing high purity ceramic parts, such as alumina or beryllia having a purity of over 99%, it is common to metallize the ceramic part with one alloy and then join the metallized ceramic part to a metal part or another ceramic part with another alloy. Such metallizing alloys encounter problems similar to those identified above with regard to the severe operating conditions occasioned by high temperatures and the use of corrosive alkali metal vapors.

An additional problem, occasioned by the relatively low strength bonds which result from the use of prior alloys and techniques, is that the bond between the various parts does not provide a hermetic or leak-tight bond, as is necessary where particular gaseous enviroments are maintained within a particular operating device. In use, the lack of a hermetic seal affects the longevity of the device and, subsequently, its usability in a particular siutation.

OBJECTS OF THE INVENTION

It is therefore an object of the present invention to provide a metallized high purity ceramic part.

It is an object of the present invention to provide a metallized high purity ceramic part wherein there is used a ternary alloy which achieves good metallizing action on the ceramic part yet is resistant to severe operating conditions during subsequent use.

A further object of the present invention is to provide a composite comprising a high purity ceramic part brazed to a refractory metal part or another ceramic part using a brazing alloy which is resistant to high temperatures and corrosive alkali metal vapors.

A further object of the present invention is to provide a composite comprising a high purity ceramic part brazed to a refractory metal part or another ceramic part wherein there is produced a hermetic seal between the high purity ceramic part and the part being joined thereto.

These and still further objects, features and advantages of the present invention will become apparent upon consideration of the following detailed disclosure.

BRIEF SUMMARY OF THE INVENTION

The above and still further objects of the present invention are achieved, in accordance therewith, through use of a ternary titanium, vanadium and zirconium alloy. More particularly, reference is made to the figure wherein the hatched portion of the ternary diagram represents those alloy compositions suitable for use in the practice of the present invention. Specifically, the single-hatched area represents those alloy compositions which given an exceptionally strong, mechanical bond between the ceramic part and the refractory part or ceramic part bonded thereto. The cross-hatched portion, and presently the preferred form of the invention, not only provides a strong, mechanical bond but a hermetic or leak-tight seal as well. Such a hermetic seal is particularly advantageous when the parts being joined will be utilized to confine an unusual gaseous environment such as an alkali metal vapor.

One procedural embodiment of the present invention involves brazing a ceramic part to a refractory metal part or a ceramic part by sandwiching a brazing alloy, defined by the hatched areas in the figure, between the parts to be joined, heating the parts and the alloy therebetween to at least the liquidus temperature of the alloy (i.e., where substantially the entire alloy material is in the liquid state), holding the parts and the melted alloy together for a sufficient period of time to establish a strong bond and thereafter cooling the parts to room temperature. There results a strong, mechanical bond between the adjacent parts and, when using the preferred alloy compositions defined by the cross-hatched area in the figure, a hermetic seal also results.

The brazing process is best achieved by providing a stack of metal shims which are positioned between the parts to be joined. Each shim contains essentially a single alloying element such that, upon heating to at least the liquidus temperature, the desired alloy composition will be formed in situ. The parts, with the brazing alloy therebetween, when heated to at least the liquidus temperature of the alloy, maintained at that temperature for a sufficient period of time, on the order of about 3–10 minutes and then cooled are bonded together by a strong, mechanical bond. To the extent that an alloy having a composition defined by the cross-hatched section in the figure is utilized, not only a strong, mechanical bond results but a hermetic seal as well.

Ceramic materials which can be used in the process of the present invention include high purity alumina, beryllium oxide, thorium oxide, etc., having about 97% purity and above. Higher purity materials (e.g., 99%) are desirable because they contain less impurities which can adversely react with the alloy composition herein described. Similarly, refractory metals which can be used in the process of the present invention include tantalum, niobium, as well as other well-known refractory metals, and alloys of refractory metals. Where the term refractory metal is used, it should be construed to include alloys of refractory metals as well.

The ceramic part and the refractory metal part to be bonded together should have substantially the same coefficients of thermal expansion or coefficients sufficiently close so that, upon cooling, the resultant bonded article is not undesirably stressed.

Where small percentages of one alloying element are utilized in the brazing or metallizing process, it is desirable to alloy the desired percentage of that element with a larger percentage of another alloying element prior to the preparation of the metal shim. In this manner, the necessity of providing an extremely thin metal shim for the low percentage alloying element is avoided.

In brazing the ceramic part and the refractory metal part or ceramic part together, the surfaces to be joined are positioned on opposite sides of the brazing alloy used in the process. The preferred range of brazing alloy compositions is shown by the cross-hatched area in the drawing since these compositions not only give strong bonds but hermetic seals as well. An exemplary composition is a brazing alloy consisting essentially of, by weight, about 56% zirconium, about 28% vanadium, and about 16% titanium. After the surfaces to be joined are positioned adjacent each other with the brazing alloy therebetween, they are heated to at least the liquidus temperature of the alloy. In the case of the representative alloy noted above, its liquidus temperature is near 1190° C. However, it is preferred to heat the surfaces and the alloy at least 50° C., and preferably 100–250° C., above such liquidus temperature to ensure that a strong seal is formed. Where a hermetic seal is desired, it may be necessary to increase the temperature to about 200–450° C. above the liquidus temperature of the alloy. Such heating should raise the temperature gradually so that the adjacent parts are maintained at substantially uniform temperature with a minimum of stress across the interfacial alloying bond. Thus, the conditions under which brazing is achieved are dependent not only upon the size and thickness of the parts to be brazed, but upon the composition of the alloy as well. Finally, the resulting brazed joint is cooled.

A second procedural embodiment of the present invention involves metallizing a high purity ceramic part by positioning the ternary titanium, vanadium and zirconium alloy adjacent the surface of the ceramic part to be metallized, heating the ceramic part and the alloy to at least the liquidus temperature of the alloy, maintaining the materials at that temperature for a sufficient period of time to form a strong bond therebetween and thereafter cooling the metallized part. An exceptionally strong bond is created between the ceramic part and the alloy layer bonded thereto, the alloy layer being resistant to the previously-identified operating conditions to which the metallized part might be subjected during subsequent use. The resultant metallized part can also be used at some subsequent time, for example, in the brazing process as defined above.

DESCRIPTION OF SPECIFIC EMBODIMENTS

The following examples are given to enable those skilled in the art to more clearly understand and practice the present invention. They should not be considered as a limitation upon the scope of the invention but merely as being illustrative thereof.

EXAMPLE I

A tensile specimen was prepared by positioning a niobium disc between two WESCO alumina AL–995 pull samples. A stack of metal shims was then positioned between the pull samples and the niobium disc, with the shims being formed of zirconium, vanadium, and titanium and having sufficient weight to form the representative alloy composition consisting of about 56% zirconium, 28% vanadium, and 16% titanium. Each of the pull samples and all of the shims, of course, were cleaned prior to the test; however, conventional cleaning procedures were used so they need not be described herein. The resulting combination was then heated to a temperature above 1150° C. for approximately 10 minutes and then cooled. Tensile testing of the sample demonstrated a sealing strength of 15,000 p.s.i. which in some cases was a lower bond since the ceramic body sheared before seal failure. Finally, a microscopic examination of the joint showed excellent metallizing of the ceramic material and a strong bond to the refractory metal which was determined to be ductible by use of a Micro hardness tester.

EXAMPLE II

A second series of tests similar to Example I were run using the General Electric high purity alumina with the trade name Lucalox in place of the WESCO 99.5% alumina. Bonding and characteristic features comparable to those obtained in Example I were also obtained.

EXAMPLE III

A brazing process using the alumina tension specimens and niobium disc of Example I was repeated using a brazing alloy comprising about 20% titanium, 15% vanadium and 65% zirconium, the resulting combination was heated to a temperature of 1575° C. for approximately 5 minutes and then cooled at an approximate rate of 40–50° C./minute. A strong, mechanical bond is achieved between the parts being joined.

EXAMPLES IV AND V

The brazing process of Example III is repeated using brazing temperatures of 1400° C. and 1500° C. with comparable results.

EXAMPLE VI

The brazing process of Example III is repeated using a brazing alloy comprising about 95% titanium, 2% vanadium and 3% zirconium. A strong, mechanical bond is achieved between the parts being joined.

EXAMPLE VII

The brazing process of Example III is repeated using a brazing alloy comprising about 1% titanium, 50% vanadium and 49% zirconium. A strong, mechanical bond is achieved between the parts being joined.

EXAMPLE VIII

The brazing process of Example III is repeated using a brazing alloy comprising about 1% titanium, 18½% vanadium and 80½% zirconium. A strong, mechanical bond is achieved between the parts being joined.

EXAMPLE IX

The brazing process of Example III is repeated using a brazing alloy comprising about 1% titanium, 35% vanadium and 64% zirconium. A strong, mechanical bond is achieved between the parts being joined.

EXAMPLES X-XI

The brazing process of Example III is repeated using a brazing alloy comprising about 1% titanium, 27% vanadium and 72% zirconium. A strong, mechanical bond is achieved between the parts being joined. The brazing process is repeated at 1400° C. with comparable results.

The cross-hatched area in the figure, defined by the quadrilateral abcd, represents those alloy compositions which yield a hermetic seal as well as a strong, mechanical bond between the ceramic part and the part being joined thereto. The alloy compositions which define the corners of the quadrilateral abcd are as follows:

(a) 42% titanium, 16% vanadium, 42% zirconium
(b) 26% titanium, 20% vanadium, 54% zirconium
(c) 22% titanium, 33% vanadium, 45% zirconium
(d) 36% titanium, 27% vanadium, 37% zirconium

EXAMPLE XII

The brazing process of Example III is repeated using the brazing alloy composition corresponding to point a. A strong, mechanical bond resulted which, when tested with a helium mass spectrometer (Consolidated Electrodynamics Corporation, Division of Bell and Howell, Pasadena, California), was found to have a leak rate less than $2 \times 10^{-10}$ atm.-cm.$^2$/second. With such a low leak rate, the bond is properly characterized as hermetic.

EXAMPLES XIII-XV

The process of Example XII was repeated using the brazing alloy corresponding to point b with comparable results. The brazing process of Example XII was repeated at 1400° C. and 1500° C. with comparable results.

EXAMPLE XVI

The process of Example XII was repeated with the brazing alloy corresponding to point c with comparable results.

EXAMPLE XVI

The process of Example XII was repeated with the brazing alloy corresponding to point c with comparable results.

EXAMPLE XVII

The process of Example XII was repeated using the alloy composition corresponding to point d with comparable results. The temperature of the brazing process was approximately 1650° C.

Thermionic converters and light sources employing high temperature vapor were constructed using the seal technique of the present invention. Operation of such devices showed that the seal was resistant to the severe operating conditions of high temperature and high pressure cesium vapor experienced by such devices.

There are a number of features of the present invention which clearly show the significant advance the present invention represents over the prior art. However, only a few of the more outstanding features will be pointed out to illustrate the more important results attained by the present invention. One feature of the present invention is that the brazing alloy used in the process of the present invention is resistant to high temperature alkali metal vapor; yet, it is sufficiently active to metallize high purity ceramic material, such as 99.9% aluminum oxide and beryllium oxide, and wet all refractory metals. Another feature of the present invention is that it uses a brazing alloy having a melting point which is sufficiently low to permit proper brazing of ceramic parts and yet is high enough to permit high operating temperatures for the resulting joint. Moreover, the vapor pressure of the lowest melting point component of the braze alloy is only approximately $10^{-7}$ torr at the melting point of the alloy so that it does not contaminate the operating surfaces. Furthermore, the brazed joint has not only an unusually high strength but also high ductility so that a good seal is maintained under the aforementioned severe operating conditions expected to be encountered in subsequent use.

It will be understood that the foregoing description and examples are only illustrative of the invention, and it is not intended that the invention be limited thereto. All substitutions, alterations, and modifications of the present invention which come within the scope of the following claims or to which the present invention is readily susceptible without departing from the spirit and scope of this disclosure are considered part of the present invention.

What is claimed is:

1. A bonded article comprising a first high purity ceramic part, and a refractory metal part or a second high purity ceramic part joined thereto, said parts being joined together by means of a brazing alloy comprising a ternary alloy of titanium, vanadium and zirconium.

2. The article of claim 1 wherein said ternary allow has a composition within a triangle in a titanium-vanadium-zirconium ternary diagram; said triangle having corners at about 95% titanium, 2% vanadium and 3% zirconium; about 1% titanium, 50% vanadium and 49% zirconium; and about 1% titanium, 18½ vanadium and 80½ zirconium.

3. The article of claim 1 wherein said ternary alloy comprises 21-42% titanium, 15-33% vanadium and 36-54% zirconium.

4. The article of claim 1 wherein said ternary allow has a composition falling within a quadrilateral abcd in a titanium-vanadium-zirconium ternary diagram; said quadrilateral being defined by points a, b, c and d and the straight lines connecting adjacent points; point a having the composition about 42% titanium, 15% vanadium and 43% zirconium; point b having the composition about 26% titanium, 20% vanadium and 54% zirconium; point c having the composition about 21% titanium, 33% vanadium and 46% zirconium; and point d having the composition about 36% titanium, 28% vanadium and 36% zirconium.

References Cited

UNITED STATES PATENTS

| | | | |
|---|---|---|---|
| 3,293,741 | 12/1966 | Gilliland | 29—494 |
| 3,487,536 | 1/1970 | Goldstein | 29—473.1 |
| 3,513,535 | 5/1970 | Clarke | 29—473.1 |
| 3,515,545 | 6/1970 | Canonico et al. | 75—134 V |

L. DEWAYNE RUTLEDGE, Primary Examiner

E. L. WEISE, Assistant Examiner

U.S. Cl. X.R.

29—473.1; 75—134 V, 175.5, 177; 117—160